United States Patent
Ishimaru

(10) Patent No.: US 6,883,393 B2
(45) Date of Patent: Apr. 26, 2005

(54) VEHICULAR COMBINATION METER

(75) Inventor: Tadaaki Ishimaru, Kariya (JP)

(73) Assignee: Denso Corporation, Kariya (JP)

( * ) Notice: Subject to any disclaimer, the term of this patent is extended or adjusted under 35 U.S.C. 154(b) by 159 days.

(21) Appl. No.: 10/242,615

(22) Filed: Sep. 13, 2002

(65) Prior Publication Data

US 2003/0056608 A1 Mar. 27, 2003

(30) Foreign Application Priority Data

Sep. 25, 2001 (JP) ......................... 2001-291359

(51) Int. Cl.⁷ ......................... G01D 7/04; G01D 11/28; B60K 35/00; G09F 13/18
(52) U.S. Cl. ..................... 73/866.3; 116/286; 340/456; 340/461
(58) Field of Search ................. 73/866.3; 340/456, 340/459, 461; 116/28.1, 62.4, 286–288

(56) References Cited

U.S. PATENT DOCUMENTS

| 4,035,764 | A | * | 7/1977 | Fujinami et al. ............ 340/459 |
| 5,949,346 | A | * | 9/1999 | Suzuki et al. ............ 340/401 X |
| 6,267,072 | B1 | * | 7/2001 | Seto ...................... 116/286 X |
| 2003/0116079 | A1 | * | 6/2003 | Sugiyami et al. ........... 116/305 |

FOREIGN PATENT DOCUMENTS

JP    B2-3082193    6/2000    ......... G01D/11/28

* cited by examiner

Primary Examiner—Thomas P. Noland
(74) Attorney, Agent, or Firm—Posz Law Group, PLC

(57) ABSTRACT

In a vehicular combination meter, dials for a speedometer and tachometer and colored segments for a shift indicator are provided on a single gauge board made of a flexible synthetic resin. The gauge board is joined to a light distribution board and installed on a rear side of a face plate in a housing.

7 Claims, 4 Drawing Sheets

VEHICULAR COMBINATION METER

CROSS REFERENCE TO RELATED APPLICATION

This application is based on Japanese Patent Application No. 2001-291359 filed on Sep. 25, 2001, the disclosure of which is incorporated herein by reference.

FIELD OF THE INVENTION

The present invention relates to a vehicular combination meter.

BACKGROUND OF THE INVENTION

For example, a vehicular combination meter disclosed in JP-B2-3082193 has a tachometer, speedometer and shift indicator. The tachometer indicates the rotational speed of an engine with a pointer rotating on a dial board. The speedometer indicates the vehicle running speed with a pointer rotating on a dial board. The shift indicator has indication boards and indicates the gear position of an automatic transmission. The indication board is arranged along a surface of a transparent colored board having different colored segments.

In the combination meter, the dial boards and the transparent colored board are separate parts. Therefore, the number of parts is increased and the structure of the meter is complicated. Further, it is inconvenient to mount the dial boards and colored board separately. Accordingly, it is difficult to reduce the manufacturing costs.

SUMMARY OF THE INVENTION

The present invention is made in view of the above disadvantages, and it is an object of the present invention to provide a vehicular combination meter in which a dial and colored segments of a shift indicator are integrally formed of a single part.

In a vehicular combination meter having an analog meter and a shift indicator, a transparent gauge board, which is made of resin, includes a dial for the meter and colored segments for the shift indicator. A face plate has an opening and indicator pieces on a front surface. The gauge board is placed behind the face plate such that the dial is visible through the opening and the colored segments are opposite to the indicator pieces.

Since the dial and the colored segments are integrally formed by the single gauge board, the number of parts is reduced and the structure of the combination meter is simplified. Further, assembly of the combination meter is relatively easy and manufacturing costs are reduced.

BRIEF DESCRIPTION OF THE DRAWINGS

Other objects, features and advantages of the present invention will become more apparent from the following detailed description made with reference to the accompanying drawings, in which.

DETAILED DESCRIPTION OF PREFERRED EMBODIMENT

A preferred embodiment of the present invention will be described hereinafter with reference to the drawings.

Figure 1:
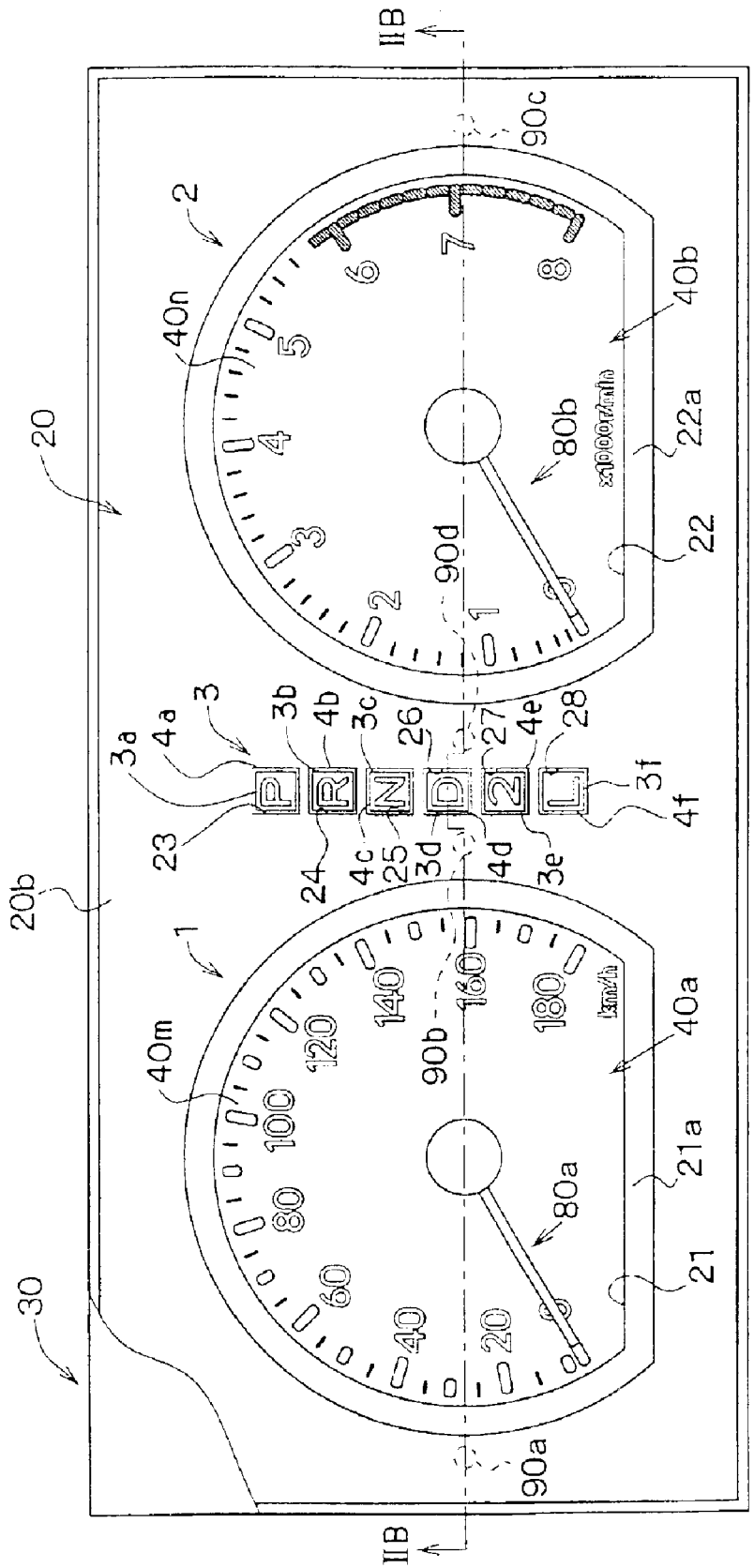
FIG. 1 is a front view of a vehicular combination meter, partially including a cutaway view, according to an embodiment of the present invention.

The combination meter of the present invention is normally installed in an instrument panel of a vehicle passenger compartment. The combination meter has a speedometer 1, a tachometer 2 and a shift indicator 3, as shown in FIG. 1. The speedometer 1, tachometer 2 and shift indicator 3 are made up of a gauge board 40, a light distribution board 50 and a control panel 60. The gauge board 40, light distribution board 50 and control panel 60 are installed in a housing, which includes a case 10, a face plate 20 and a front panel 30, as shown in FIG. 2B. The case 10 has a substantially U-shaped cross-section. The front panel 30 is made of a transparent glass and has a substantially U-shaped cross-section. The outer wall of the front panel 30 is joined to the outer wall 11 of the case 10 through peripheral ends of the face plate 20.

The face plate 20 has a body 20a made of a transparent material such as transparent resin. An opaque material 20b made of an opaque printing material, such as a black printing material, is printed on the front surface of the body 20a. The face plate 20 has openings 21 and 22 at positions corresponding to dial boards 40a and 40b of the speedometer 1 and tachometer 2, respectively. As shown in FIG. 2B, edges 21a and 22a, which define the opening 21 and 22, are inclined toward the dial boards 40a and 40b.

An indicator section 20c is located at a middle part of the face plate 20 as shown in FIGS. 1 and 2B. The indicator 3 has indicator pieces 3a to 3f for indicating, when lit, the gear positions of an automatic transmission. The indicator pieces 3a to 3f are formed on the indicator section 20c of the face plate 20. The indicator pieces 3a to 3f are arranged in the vertical direction, as shown in FIG. 1.

Figure 2A:
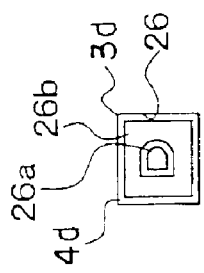
FIG. 2A is a front view of an indicator piece.
Figure 2B:
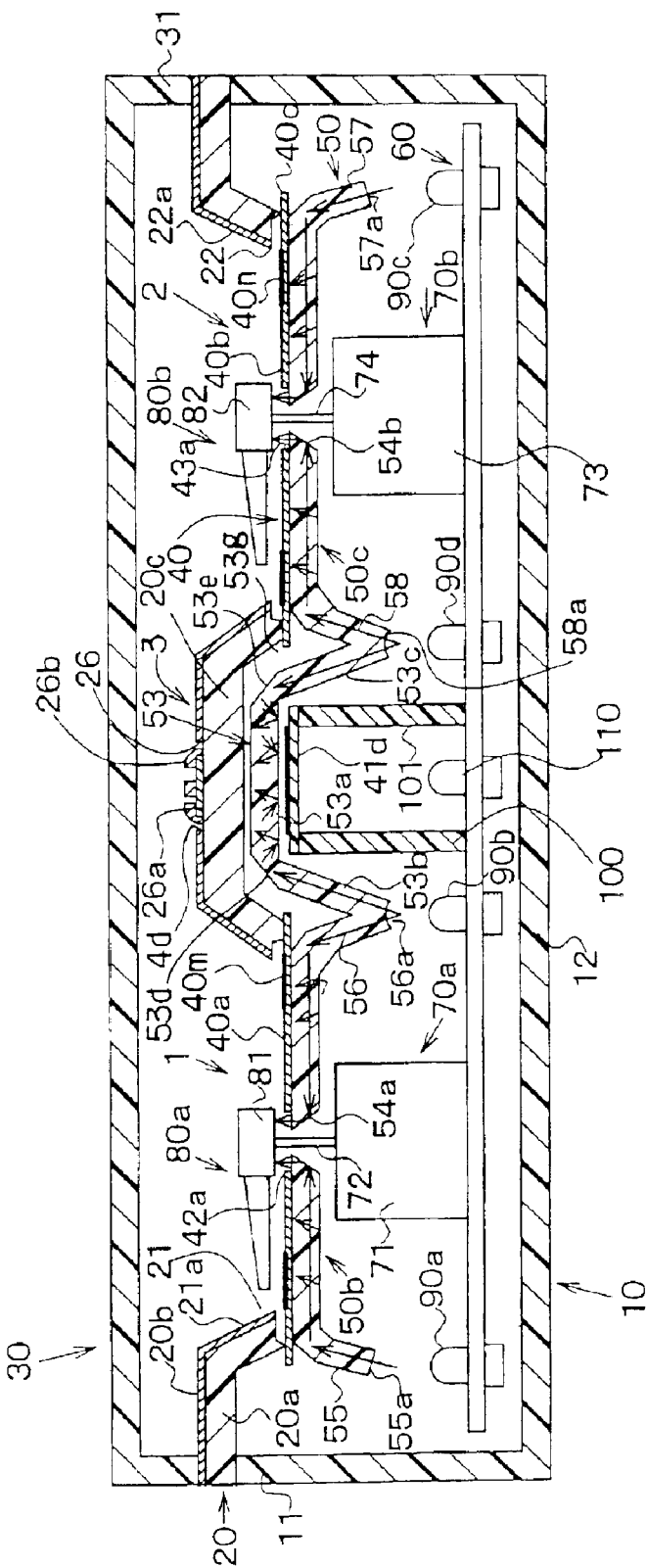
FIG. 2B is a cross-sectional view of the vehicular combination meter taken along line IIB—IIB in FIG. 1.

In FIG. 2A, a front view of the indicator piece 3d for indicating a drive position is illustrated, as an example. For example, the opaque printed layer 20b is cutout into a rectangular-shape so that a cutout section 26 is formed on the indicator section 20c. A white layer 26a having a rectangular shape is printed on the surface of the indicator section 20c within the rectangular cutout section 26. The white layer 26a is made of a transparent white printing material. Further, an opaque layer 26b is printed on the white layer 26a. The white layer 26a, other than its outer margin, is covered with the opaque layer 26b. The opaque layer 26b is made of the same material as that of the opaque printed layer 20b. A letter D for indicating the driving position is cutout in the opaque layer 26b. A rectangular margin 4d is defined between the outer edge of the rectangular-shaped opaque layer 26b and the inner perimeter of the cutout section 26. Therefore, the letter D is indicated with light, which is distributed to the indicator section 20c from the light distribution board 50 and passed through the gap 4d and the letter D.

Similarly, the indication pieces 3a, 3b, 3c, 3e and 3f are formed in cutout sections 23, 24, 25, 27 and 28 formed on the indicator section 20c of the face plate 20. The indicator pieces 3a, 3b, 3c, 3e and 3f respectively indicate parking, reverse, neutral, second and first positions of the automatic transmission. Letters P, R, N, 2, and L are cut out in the indicator pieces 3a, 3b, 3c, 3e and 3f, respectively. Similar to the margin 4d, rectangular margins 4a, 4b, 4c, 4e and 4f are defined on the indicator pieces 3a, 3b, 3c, 3e and 3f, respectively, as shown in FIG. 1. Similar to the indication piece 4d, letters P, R, N, 2, and L are lit by light passing through the indicator pieces 3a, 3b, 3c, 3e and 3f, respectively.

Figure 3:
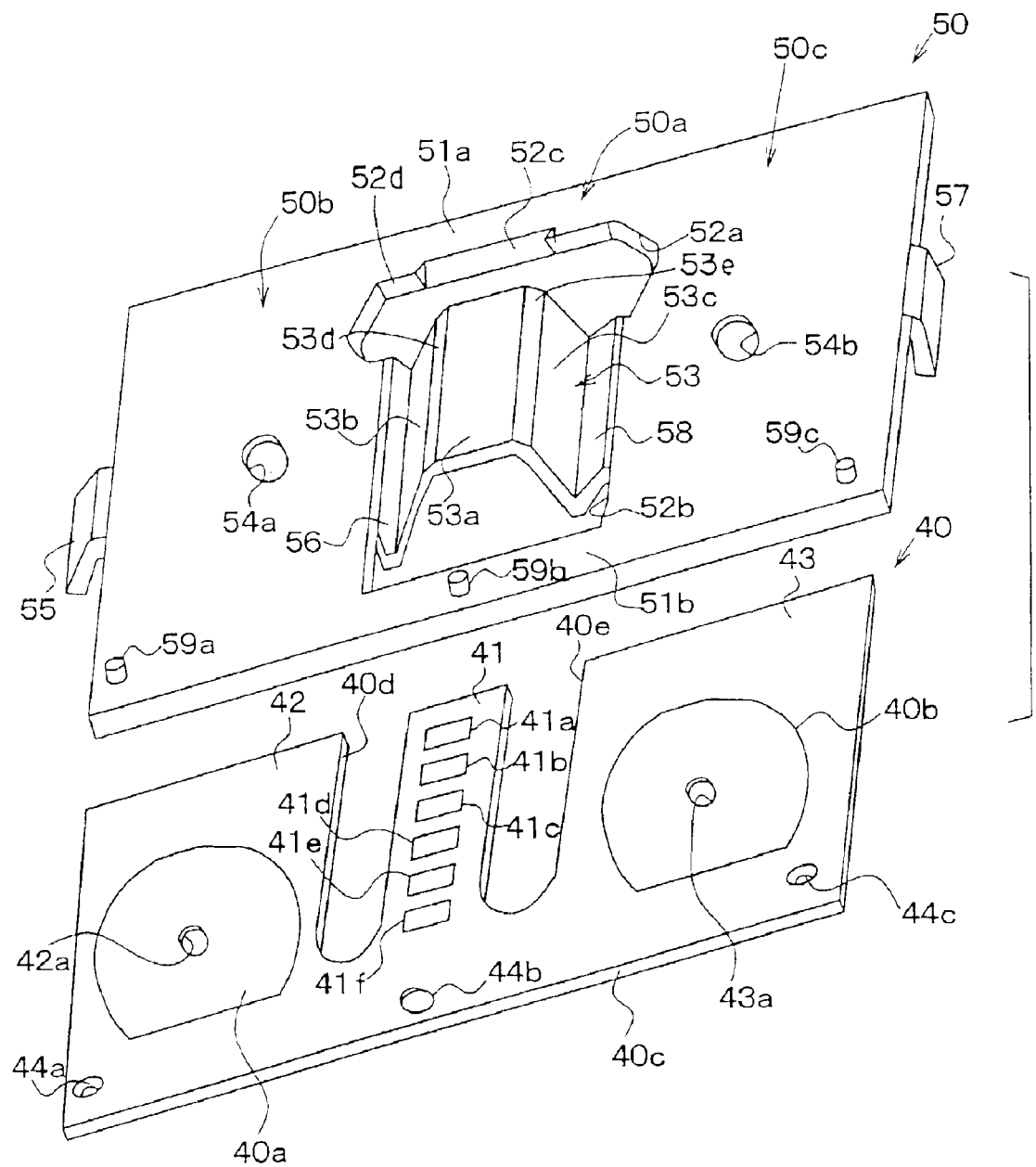
FIG. 3 is an exploded perspective view of a light distribution board and a gauge board according to the embodiment of the present invention.

The gauge board 40 is positioned behind the face plate 20 with the light distribution board 50, as shown in FIG. 2B. The gauge board 40 has a body 40c made of transparent, flexible polycarbonate resin. As shown in FIG. 3, the board body 40c has substantially U-shaped cutout sections 40d and 40e. The board body 40c has a middle section 41 between the cutout sections 40d and 40e, a first section 42 on a left side and a second section 43 on a right side in FIG. 3. The first section 42 includes a dial board 40a for the speedometer 1. The second section 43 includes a dial board 40b for the tachometer 2. The middle section 41 includes colored board (segments) 41a to 41f in correspondence with the indicator pieces 3a to 3f.

The colored segments 41a to 41f are provided by printing transparent printing materials having different colors with substantially rectangular shapes on the middle section 41. The colored segments 41a to 41f oppose the indicator pieces 3a to 3f, respectively. The light emitted from the rear side and passed through the colored segments 41a to 41f is colored and emitted toward the indicator section 20c.

As shown in FIGS. 1 and 2B, scales 40m and 40n are printed on the surfaces of the dial boards 40a and 40b in arc-shapes, respectively. The board body 40c has through holes 42a and 43a at the centers of the dial boards 40a and 40b. Also, the board body 40c has positioning holes 44a to 44c.

The light distribution board 50 is made of resin that is colorless and transparent and distributes light. The light distribution board 50 has a first light distribution section 50b on the left side in FIG. 3, a second light distribution section 50c on the right side and a middle light distribution section 50a between the first and second light distribution sections 50b and 50c.

The middle light distribution section 50a has a top end 51a, a bottom end 51b and a bent section 53 substantially in a middle portion as shown in FIG. 3. Further, the middle light distribution section 50a has an upper opening 52a between the top end 51a and the bent section 53a and a lower opening 52b between the bent section 53 and the bottom end 51b. The bent section 53 has a substantially reversed U-shaped cross-section and defines a rearward space, as shown in FIG. 2B. The bent section 53 has a front wall 53a, and a first and second side walls 53b and 53c.

Figure 4:
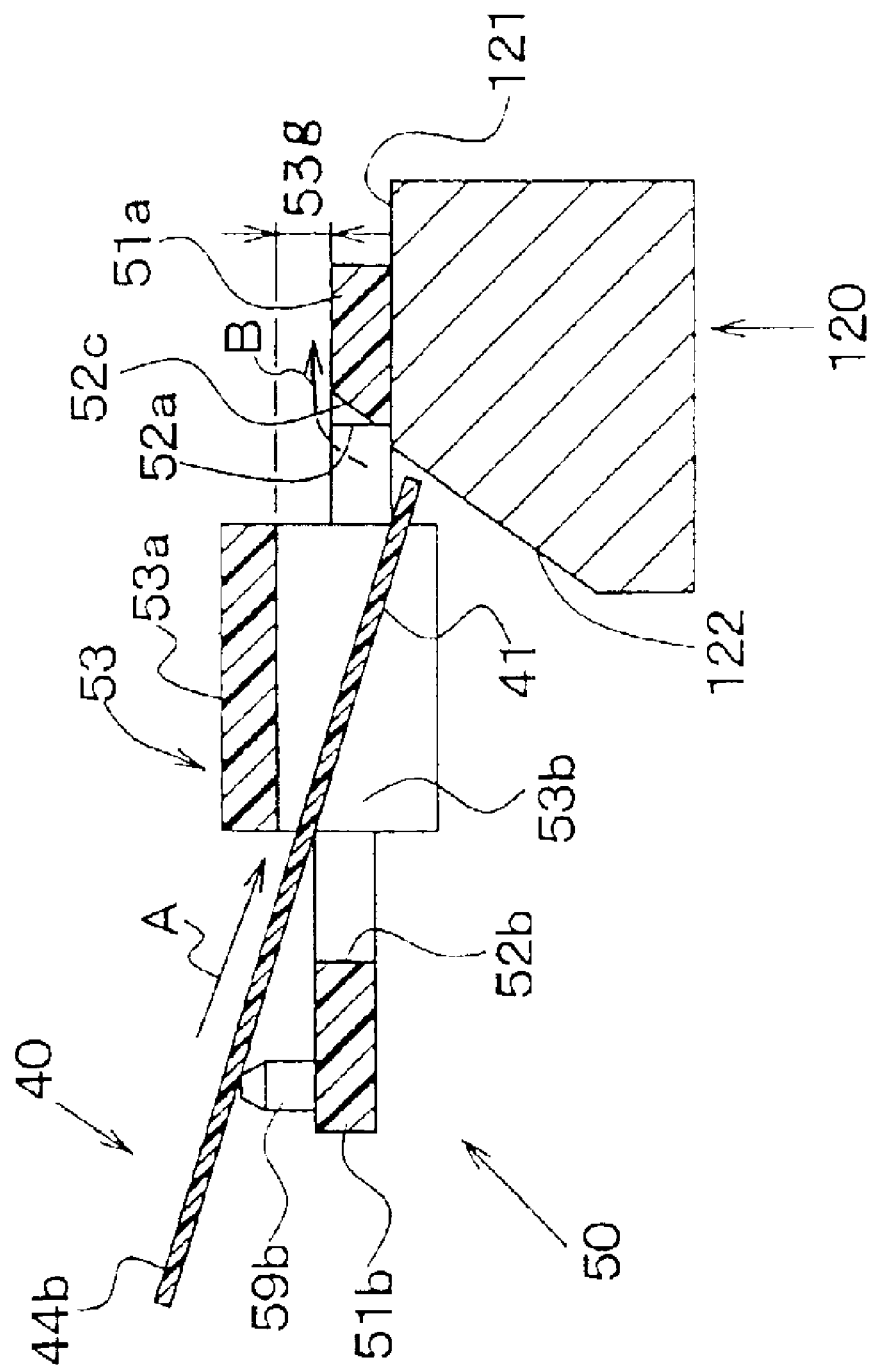
FIG. 4 is a cross-sectional view showing assembly of the gauge board and the light distribution board.

The front wall 53a is positioned on a rear side of the indicator section 20c of the face plate 20, as shown in FIG. 2B. The front wall 53a is substantially flat. The front wall 53a distributes and reflects light introduced from side walls 53b and 53c, thereby illuminating uniformly. The front wall 53a protrudes forward. That is, in FIG. 2B, the front wall 53a is higher than the top and bottom ends 51a and 51b and the first and second light distribution sections 50b and 50c. Therefore, a gap 53g is defined between the rear surface of the front wall 53a and the front surfaces of the top and bottom ends 51a and 51b, as shown in FIG. 4.

The first and second side walls 53b and 53c extend diagonally from sides of the front wall 53a to the rear side of the light distribution board 50, respectively. As shown in FIG. 2B, the side walls 53b and 53c are symmetrical with respect to a center plane as shown in FIG. 2B. Distal ends of the side walls 53b and 53c are located below the rear surfaces of the first and second light distribution sections 50b and 50c, as shown in FIG. 2B. Top surfaces 53d and 53e of the side walls 53b and 53c are inclined downwardly near the boundary of the front wall 53a, as shown in FIGS. 2B and 3.

The upper and lower openings 52a and 52b are positioned between the bent section 53 and the top and bottom ends 51a and 51b, respectively. A bottom surface 52d of the top end 51a, which defines a part of the upper opening 52a, has a guide surface 52c in a substantially middle portion, as shown in FIG. 3. The guide surface 52c is formed by chamfering the bottom surface 52d diagonally from the rear side to the front side of the light distribution board 53.

The first light distribution section 50b corresponds to the first section 42 of the gauge board 42. The first light distribution section 50b has a through hole 54a corresponding to the through hole 42a. The though hole 54a is narrowed toward the front surface of the light distribution board 50. That is, the through hole 54a has a tapered shape in cross-section, as shown in FIG. 2. Therefore, the light introduced in the first light distribution section 50b is reflected by the inner surface of the through hole 54a to pass through the through hole 42a of the dial board 40a.

The first light distribution section 50b has a first and second extended walls 55 and 56. The first extended wall 55 extends from a substantially middle portion of an end (left end in FIG. 3) of the first light distribution section 50b. The first extended wall 55 extends diagonally to the rear side of the light distribution board 50. The first extended wall 55 is tapered in cross-section, as shown in FIG. 2B. The first extended wall 55 has a first incidence surface 55a at the end. The second extended wall 56 extends from the other side of the first light distribution section 50b diagonally to the rear side of the light distribution board 50. The length of the second extended wall 56 in the vertical direction of FIG. 1 is substantially the same as that of the side wall 53b. The second extended wall 56 is continued to the end of the first side wall 53b of the bent section 53. The second extended wall 56 and the first side wall 53b have a substantially V-shaped cross-section, as shown in FIG. 2B. The second extended wall 56 and the first side wall 53b provide a second incidence surface 56a at their lower ends.

The second light distribution section 50c corresponds to the second section 43 of the gauge board 40. The second light distribution section 50c has a through hole 54b to correspond to the through hole 43a of the dial board 40b. The through hole 54b has a structure similar to the through hole 54a. Therefore, the light introduced in the second light distribution section 50c is reflected by the inner surface of the through hole 54a to pass through the through hole 43a. The second light distribution section 50c has third and fourth extended walls 57 and 5B. The third and fourth extended walls 57 and 58 have structures similar to the first and second extended walls 55 and 56, respectively. Similar to the second extended walls 56 and the first side wall 53b, the fourth extended wall 58 and the second side wall 53c are provided with a fourth incidence surface 58a at the lowest end, as shown in FIG. 2B. The third extended wall 57 has a third incidence surface 57a at the end. The light distribution board 50 has positioning projections 59a to 59c.

The instrument panel 40 is joined to the light distribution board 50 such that the middle section 41 is inserted in the gap 53g defined between the front wall 53a and side walls 53b and 53c through the lower opening section 52b. The top end of the middle section 41 is positioned on the top end 51a of the middle light distribution section 50a. The first and second sections 42 and 43 of the gauge board 40 are positioned on the front surfaces of the first and second light distribution sections 50b and 50c, respectively. The positioning holes 44a to 44c are fitted on the positioning projections 59a to 59c, respectively, so that the gauge board 40 is properly positioned on the light distribution board 50.

The dial board 40a is laid on the first light distribution section 50b. The through hole 42a is aligned with the through hole 54a. The middle section 41 of the gauge board 40 faces the rear surface of the front wall 53a of the light distribution board 50, so that the colored segments 41a to 41f are opposite to the indicator pieces 3a to 3f through the front wall 53a and the face plate body 20a. The first and second side walls 53b and 53c are placed through the cutout section 40d and 40e.

The control panel 60 is supported on the rear side of the light distribution board 50 in the case 10. The control panel 60 is parallel with the light distribution board 50.

The speedometer 1 includes the first dial board 40a, the first light distribution section 50b, a first driving unit 70a, an illuminating pointer 80a, and a first and second light sources 90a and 90b. The first driving unit 70a has a driving body 71 and a rotatable output shaft 72. The driving unit 70a is mounted on the control panel 60 at a position corresponding to the dial board 40a. The output shaft 72 extends from the driving body 71 through the through hole 54a and the through holes 40a.

The illuminating pointer 80a has a rotation base 81. The rotation base 81 is supported at the end of the output shaft 72. The illuminating pointer 80a extends and moves over the surface of the dial board 40a. Light that has passed through the through hole 42a enters the rotation base 81 to illuminate the illuminating pointer 80a.

The first and second light sources 90a and 90b are mounted on the control panel 60. Specifically, the first light source 90a is opposite to the first incidence surface 55a. The light from the first light source 90a enters the first extended wall 55 from the first incidence surface 55a. The first light distribution section 50b distributes the light toward the dial board 40a and the through hole 54a.

The second light source 90b is positioned between the first dial board 40a and the indicator boards 3a to 3f and is opposite to the second incidence surface 56a. The light from the second light source 90b enters the second extended wall 56 and the first side wall 53b from the incidence surface 56a. The first light distribution section 50b distributes light from the second extended wall 56 toward the dial board 40a and the through hole 54a. The bent section 53 distributes the light from the side wall 53b to the front wall 53a. The light is reflected in the front wall 53a.

The tachometer 2 has the second dial board 40b, the second light distribution section 50c, a second driving unit 70b, a second illuminating pointer 80b and a third and fourth light sources 90c and 90d. The driving unit 70b has a driving body 73 and a rotatable output shaft 74. The driving body 73 is mounted on the control panel 60 at a position corresponding to the second dial board 40b. The second output shaft extends from the driving body 72 through the through hole 54b and the through hole 43a.

The illuminating pointer 80b has a rotation base 82. The rotation base 82 is supported at the end of the output shaft 74. The illuminating pointer 80b extends and moves over the surface of the dial board 40b. Therefore, light that has passed through the through hole 43a enters the rotation base 82 and illuminates the illuminating pointer 80b.

The third and fourth light sources 90c and 90d are mounted on the control panel 60, as shown in FIGS. 1 and 2B. The third light source 90c is opposite to the third incidence surface 57a of the third extended wall 57. The light from the third light source 90c enters the extended wall 57 from the incidence surface 57a. The second light distribution board 50c distributes the light from the extended wall 57 toward the dial board 40b and the through hole 54b.

The fourth light source 90d is positioned between the second dial board 40b and the indicator pieces 3a to 3f. The fourth light source 90d is opposite to the fourth incidence surface 58a. The light from the fourth light source 90d enters the fourth extended wall 58 and the side wall 53c from the incidence surface 58a. The second light distribution board 50c distributes the light toward the dial board 40b and through hole 54b. The bent section 53 distributes the light from the second side wall 53c to the front wall 53a. The light is reflected in the front wall 53a.

The shift indicator 3 has the indicator pieces 3a to 3f, the indicator section 20c of the face plate body 20b, the front wall 53a of the bent section 53, the middle section 41 including the colored segments 41a to 41f, a box 100 and light sources. In FIG. 2B, an exemplary light source 110 for illuminating the indicator piece 3d is illustrated. The box 100 is positioned on the rear side of the bent section 53. An open end of the box 100 is attached to the rear surface of the middle section 41. The opposite open end of the box 100 is fixed to the surface of the control panel 60. The box 100 is divided into a plurality of chambers. In FIG. 2B, an exemplary chamber 101 for the indicator piece 3d of the driving position is illustrated. The colored segments 41a to 41f are located on open ends of the chambers, respectively.

The light sources for the indicator 3 are mounted on the control panel 60. Each chamber has one light source. White lights from the light sources are emitted toward the colored segments 41a to 41f in the chambers, respectively.

In the present embodiment, the single gauge board body 40c has the middle section 41, and the first and second section 42 and 43. The colored segments 41a to 41f are printed on the middle section 41. The dial boards 40a and 40b are formed on the first and second sections 42 and 43, respectively.

Since the dial boards 40a and 40b and the colored segments 41a to 41f are integrally formed on the gauge board 40, it is unnecessary to provide dial boards and colored segments separately. Therefore, it is possible to reduce the number of parts and to simplify the structures.

The gauge board 40 is mounted on the light distribution board in a following manner. First, a longitudinal jig 120 having a cross-section shown in FIG. 4 is prepared. The top end 51a of the light distribution board 50 is mounted on a top surface 121 of the jig 120 and is held parallel with the top surface 121.

In this state, the top end of the middle section 41 is placed on the positioning projection 59b. The gauge board 40 is inclined against the light distribution board 50 and inserted in the gap 53g of the bent section 53 through the lower opening section 52b in a direction of an arrow A in FIG. 4 while the rear surface of the middle section 41 slides on the positioning projection 59b. At this time, the first and second sections of the gauge board 40 diagonally slide on the surfaces of the first and second light distribution sections 50b and 50c. The top end of the middle section 41a of the gauge board 40 reaches an inclined surface 122 of the jig 120.

When the middle section 41 of the gauge board 40 is further inserted into the bent section 53 diagonally, the top end of the middle section 41 is slid upward along the inclined surface 122 and is guided further upward on the guide surface 52c onto the top end 51a of the light distribution board 50 as shown by an arrow B in FIG. 4. Then, the positioning holes 44a to 44c are fitted on the positioning projections 59a to 59c, so the gauge board 40 is properly positioned on the light distribution board 50. In this way, the gauge board 40 is easily mounted on the light distribution board 50.

In the present embodiment, a general pointer can be used in place of the illuminating pointer 80a and 80b. In this case, a structure to guide light to the pointers through the through holes 54a and 54b is not required. Although the light distribution board 50 is formed from a single part, light distribution sections 50a, 50b and 50c can be formed from separate parts. The combination meter is not limited to automobile use and can be used on other vehicles.

The present invention should not be limited to the disclosed embodiments, but may be implemented in other ways without departing from the spirit of the invention.

What is claimed is:

1. A vehicular combination meter comprising:
   an analog meter having:
      a face plate having a front surface, a rear surface and an opening;
      a transparent dial having a through hole, wherein the dial is located behind the face plate such that the dial is visible through the opening;
      a driving unit located behind the dial, the driving unit including a driving body and an output shaft, wherein the output shaft is rotatably fixed to the driving body and extends through the through hole;
      a pointer supported by the output shaft for rotation over a front surface of the dial;
   a shift indicator for indicating a gear position of a transmission in accordance with a shift operation, the shift indicator having:
      indicator pieces provided on the front surface of the face plate next to the opening and aligned;
      transparent colored segments located behind the face plate and opposite to indicator pieces, respectively, the colored segments each having a different color to color light passing through the color segment toward the indicator piece, wherein the dial and the colored segments are formed of a single gauge board made of a transparent resin;
   a first light distribution member located along a rear surface of the dial for distributing light to the dial; and
   a second light distribution member located along front surfaces of the colored segments for distributing light to the indicator pieces.

2. A vehicular combination meter comprising:
   an analog meter having:
      a face plate having a front surface, a rear surface and an opening;
      a transparent dial having a through hole, wherein the dial is located behind the face plate such that the dial is visible through the opening;
      a driving unit located behind the dial, the driving unit including a driving body and an output shaft, wherein the output shaft is rotatably fixed to the driving body and extends through the through hole;
      a pointer supported by the output shaft for rotation over a front surface of the dial;
   a shift indicator for indicating a gear position of a transmission in accordance with a shift operation, the shift indicator having;
      indicator pieces provided on the front surface of the face plate next to the opening and aligned;
      transparent colored segments located behind the face plate and opposite to indicator pieces, respectively, the colored segments each having a different color to color light passing through the color segment toward the indicator piece,
   wherein the dial and the colored segments are formed of a single gauge board made of a transparent resin; and
   a light distribution board located behind the face plate, wherein the light distribution board has a first light distribution section and a second light distribution section, wherein the second light distribution section is displaced forward from a front surface of the first section, and the light distribution board is joined to the gauge board such that the first section is located along a rear surface of the dial board and the second section is located along front surfaces of the colored segments.

3. The meter according to claim 2, wherein the second distribution section protrudes forward and has a front wall, first and second side walls and defines an opening, the front wall being opposite to the indicator pieces and the side walls extending from opposite ends of the front wall rearward to define a substantially U-shaped space, wherein the gauge board has a U-shaped cutout that is cut from an edge between the dial and the colored segments, and the gauge board is joined to the light distribution board such that a portion of the gauge board having the colored segments is located in the space through the opening defined by the first and second side walls and the first side wall is located in the cutout.

4. A vehicular combination meter having an analog meter and a shift indicator comprising:
   a face plate having a front surface, a rear surface and an opening;
   an indicator section provided on the front surface of the face plate adjacent to the opening, wherein the indicator section has indicator pieces for indicating a gear position in accordance with a shift operation;
   a transparent gauge board made of resin, wherein the gauge board is provided with a dial section having a dial and a color section having colored segments, wherein each colored segment has a different color to color light passing through the colored segment, and the gauge board is located behind the face plate such that the dial is visible through the opening and the color section is opposite to the indicator section; and
   a light distribution board located behind the face plate, wherein the light distribution board has a first light distribution section for distributing a light toward the dial and a second light distribution section for distributing a light toward the indicator board, wherein the second light distribution section protrudes forward from the first section and defines a rearward space, and the light distribution board is joined to the gauge board such that the dial section is located in front of a front surface of the first light distribution section and the color section is located in the rearward space.

5. The meter according to claim 4, wherein the gauge board has a substantially U-shaped cutout between the dial section and the color section, and the second light distribution section defines an opening through which the color section of the gauge board is located in the rearward space.

6. The meter according to claim 4, further comprising:
   a driving unit located behind the first light distribution section, wherein the driving unit has a driving body and an output shaft rotatably fixed to the driving body, and wherein the dial section and first light distribution sections have respective through holes, and the output shaft extends to a front surface of the dial from the driving body through the through holes; and a pointer supported by the output shaft for moving over the front surface of the dial.

7. A vehicular combination meter having an analog meter and a shift indicator comprising:

a face plate having a front surface, a rear surface and an opening;

an indicator section provided on the front surface of the face plate adjacent to the opening, wherein the indicator section has indicator pieces for indicating a gear position in accordance with a shift operation;

a transparent gauge board made of resin, wherein the gauge board is provided with a dial section having a dial and a color section having colored segments, wherein each colored segment has a different color to color light passing through the colored segment, and the gauge board is located behind the face plate such that the dial is visible through the opening and the color section is opposite to the indicator section; and a light distribution board located behind the face plate, wherein the light distribution board includes a first light distribution section and a second light distribution section, wherein the second light distribution section has a protruded section in a substantially middle portion, the protruded section protruding toward the face plate and defining an opening, and the light distribution board is joined to the gauge board such that the dial section is located in front of the first light distribution section and the color section is located behind the protruded section through the opening defined thereby.

* * * * *